US007702073B2

(12) United States Patent
Harding

(10) Patent No.: US 7,702,073 B2
(45) Date of Patent: Apr. 20, 2010

(54) SYSTEMS AND METHODS FOR DEVELOPING A SECONDARY COLLIMATOR

(75) Inventor: Geoffrey Harding, Hamburg (DE)

(73) Assignee: Morpho Detection, Inc., Newark, CA (US)

( * ) Notice: Subject to any disclaimer, the term of this patent is extended or adjusted under 35 U.S.C. 154(b) by 521 days.

(21) Appl. No.: 11/531,019

(22) Filed: Sep. 12, 2006

(65) Prior Publication Data

US 2010/0061514 A1 Mar. 11, 2010

(51) Int. Cl.

*G01N 23/201* (2006.01)
*G21K 1/04* (2006.01)
*G21K 1/02* (2006.01)

(52) U.S. Cl. .......................... 378/86; 378/149; 378/150

(58) Field of Classification Search ............. 378/86–91, 378/147–151, 210, 901; 250/363.1; 703/1, 703/3–5, 7, 13; 430/4, 5, 23, 24, 139

See application file for complete search history.

(56) References Cited

U.S. PATENT DOCUMENTS

| | | | | |
|---|---|---|---|---|
| 4,149,248 | A * | 4/1979 | Pavkovich | 378/14 |
| 4,321,473 | A * | 3/1982 | Albert | 378/149 |
| 5,008,911 | A * | 4/1991 | Harding | 378/86 |
| 5,600,303 | A | 2/1997 | Husseiny et al. | |
| 6,054,712 | A * | 4/2000 | Komardin et al. | 250/363.06 |
| 6,396,902 | B2 * | 5/2002 | Tybinkowski et al. | 378/150 |
| 6,532,276 | B1 * | 3/2003 | Hartick et al. | 378/88 |
| 6,542,578 | B2 * | 4/2003 | Ries et al. | 378/147 |
| 6,693,988 | B2 * | 2/2004 | Harding | 378/86 |
| 7,103,145 | B2 * | 9/2006 | Wong et al. | 378/117 |
| 2006/0140340 | A1 * | 6/2006 | Kravis | 378/57 |

FOREIGN PATENT DOCUMENTS

| | | | |
|---|---|---|---|
| EP | 1 241 470 | B1 | 3/2001 |
| EP | 1 347 287 | A1 | 2/2002 |
| EP | 1280165 | A2 | 1/2003 |
| FR | 1141914 | A | 9/1957 |
| WO | 2006063849 | A1 | 6/2006 |

OTHER PUBLICATIONS

International Search Report for PCT/US2007/074940; mail date Mar. 13, 2008.
U.S. Appl. No. 11/434,431, filed May 15, 2006, Geoffrey Harding.
U.S. Appl. No. 11/504,263, filed Aug. 15, 2007, Geoffrey Harding.
U.S. Appl. No. 11/498,114, filed Aug. 2, 2006, Geoffrey Harding.
U.S. Appl. No. 11/498,113, filed Aug. 2, 2006, Geoffrey Harding.

(Continued)

*Primary Examiner*—Edward J Glick
*Assistant Examiner*—Anastasia Midkiff
(74) *Attorney, Agent, or Firm*—Armstrong Teasdale LLP

(57) ABSTRACT

A method for developing a secondary collimator is described. The method includes orienting a plurality of collimator elements in a plane such that a gap is defined between a first collimator element and a second collimator element. The first collimator element has a first curved end, and the first curved end faces the second collimator element across the gap.

18 Claims, 6 Drawing Sheets

OTHER PUBLICATIONS

U.S. Appl. No. 11/484,186, filed Jul. 11, 2006, Geoffrey Harding.
U.S. Appl. No. 11/416,526, filed May 3, 2006, Geoffrey Harding.
U.S. Appl. No. 11/541,716, filed Sep. 29, 2006, Geoffrey Harding.
U.S. Appl. No. 11/434,486, filed May 15, 2006, Geoffrey Harding.
U.S. Appl. No. 11/434,291, filed May 15, 2006, Geoffrey Harding.
U.S. Appl. No. 11/504,395, filed Aug. 15, 2006, Geoffrey Harding.
U.S. Appl. No. 11/531,037, filed Sep. 12, 2006, Geoffrey Harding.
Hubbell, J.H., Veigele, W.J., Briggs, E.A., Brown, R.T., Cromer, D.T., Howerton, R.J., "Atomic Form Factors, Incoherent Scattering Functions and Photon Scattering Cross-sections," Journal of Physics and Chemical Reference Data, vol. 4, No. 3, pp. 471-538 (1975).
Hubbell, J.H., Veigele, W.J., Briggs, E.A., Brown, R.T., Cromer, D.T., Howerton, R.J., "Erratum; Atomic Form Factors, Incoherent Scattering Functions, and Photon Scattering Cross Sections," Journal of Physics and Chemical Reference Data, vol. 6, pp. 615-616 (1977).
Schlomka et al., "Coherent Scatter Computer Tomography—A Novel Medical Imaging Technique," Physics of Medical Imaging, Proceedings of SPIE—vol. 5030, pp. 256-265 (2003).
Rabiej M., "Determination of the Degree of Crystallinity of Semicrystalline Polymers by Means of the 'OptiFit' Computer Software," Polimery 6, pp. 423-427 (2002) .
"Percentage Crystallinity Determination by X-Ray Diffraction," XRD-6000 Application Brief, Kratos Analytical—A Shimadzu Group Company, pp. 1-5 (1999).
A.M. Hindeleh and D. J. Johnson, "The Resolution of Multipeak Data in Fibre Science," J. Phys. D: Appl. Phys., vol. 4. Printed in Great Britain, pp. 259-263 (1971).

* cited by examiner

SYSTEMS AND METHODS FOR DEVELOPING A SECONDARY COLLIMATOR

BACKGROUND OF THE INVENTION

This invention relates generally to imaging systems and more particularly to systems and methods for developing a secondary collimator.

The events of Sep. 11, 2001 instigated an urgency for more effective and stringent screening of airport baggage. The urgency for security expanded from an inspection of carry-on bags for knives and guns to a complete inspection of checked bags for a range of hazards with particular emphasis upon concealed explosives. X-ray imaging is a widespread technology currently employed for screening. However, existing x-ray baggage scanners, including computed tomography (CT) systems, designed for detection of explosive and illegal substances are unable to discriminate between harmless materials in certain ranges of density and threat materials like plastic explosive.

A plurality of identification systems based on a plurality of x-ray diffraction (XRD) techniques provide an improved discrimination of materials compared to that provided by the x-ray baggage scanners. The XRD identification systems measure a plurality of d-spacings between a plurality of lattice planes of micro-crystals in materials. However, a signal-to-noise ratio provided by the XRD identification systems is difficult to improve.

BRIEF DESCRIPTION OF THE INVENTION

In one aspect, a method for developing a secondary collimator is described. The method includes developing the secondary collimator having a first collimator element. The first collimator element has a first curved end.

In another aspect, a processor configured to develop a secondary collimator having a collimator element is described. The collimator element has a curved end.

In yet another aspect, an imaging system is described. The imaging system includes a source configured to generate energy, a detector configured to detect the energy, and a collimator placed between an object and the detector. The collimator includes a collimator element having a curved end.

DETAILED DESCRIPTION OF THE INVENTION

Figure 1:
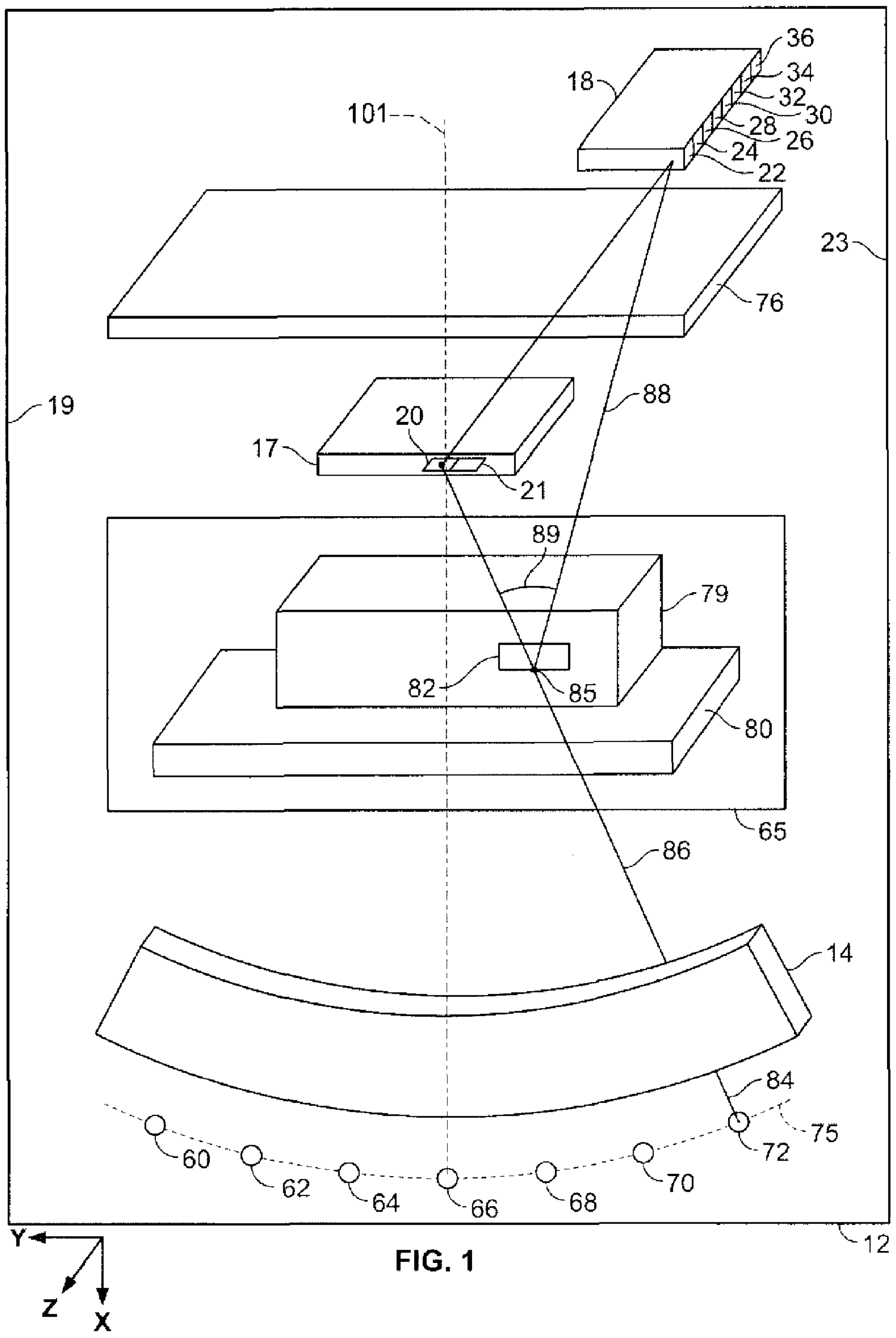
FIG. 1 is an isometric view of an embodiment of a gantry implementing a secondary collimator.

FIG. 1 is an isometric view of a block diagram of an embodiment of a gantry 12. Gantry 12 includes a primary collimator 14, a transmission detector 17, a scatter detector 18, and a secondary collimator 76. Scatter detector 18 is a segmented semiconductor detector. Gantry 12 has a side wall 19 and another side wall 23 facing side wall 19.

Transmission detector 17 includes a plurality of detector elements, such as detector elements 20 and 21. Scatter detector 18 includes a plurality of detector cells or detector elements 22, 24, 26, 28, 30, 32, 34, and 36 for detecting coherent scatter. Scatter detector 18 includes any number, such as, ranging from and including 5 to 1200, of detector elements. For example, scatter detector 18 includes a number, such as ranging from and including 5 to 40, of detector elements in a z-direction parallel to a z-axis, and a number, such as ranging from and including 1 to 30 detector elements in a y-direction parallel to a y-axis. An x-axis, the y-axis, and the z-axis are located within an xyz co-ordinate system. The x-axis is perpendicular to the y-axis and the z-axis, and the y-axis is perpendicular to the z-axis, and the x-axis is parallel to an x-direction. X-ray sources, of gantry 12, including x-ray sources 60, 62, 64, 66, 68, 70, and 72, and transmission detector 17 form an inverse single-pass multi-focus imaging system. X-ray sources, of gantry 12, including x-ray sources 60, 62, 64, 66, 68, 70 and 72, have an inverse fan-beam geometry that includes a symmetric location of the x-ray sources relative to the z-axis.

Scatter detector 18 and transmission detector 17 are located in the same yz plane. The yz plane is formed by the y-axis and the z-axis. Scatter detector 18 is separate from transmission detector 17 by a shortest distance ranging from and including 30 mm to 60 mm in the z-direction.

Gantry 12 further includes x-ray sources 60, 62, 64, 66, 68, 70, and 72. X-ray sources 60, 62, 64, 66, 68, 70, and 72 are located parallel to and coincident with an arc 75. It is noted that in an alternative embodiment, gantry 12 includes a higher number, such as 10 or 20, or alternatively a lower number, such as 4 or 6, of x-ray sources than that shown in FIG. 1. A centroid of transmission detector 17 is located at a center of circle having arc 75. Each x-ray source 60, 62, 64, 66, 68, 70, and 72 is an x-ray source that includes a cathode and an anode. Alternatively, each x-ray source 60, 62, 64, 66, 68, 70, and 72 is an x-ray source that includes a cathode and all x-ray sources 60, 62, 64, 66, 68, 70, and 72 share a common anode.

A container 79 is placed on a support 80 between x-ray sources 60, 62, 64, 66, 68, 70, and 72, and scatter detector 18. Container 79 and support 80 are located within an opening 65 of gantry 12. Examples of container 79 include a bag, a box, and an air cargo container. Examples of each x-ray source 60, 62, 64, 66, 68, 70, and 72 include a polychromatic x-ray source. Container 79 includes a substance 82. Examples of substance 82 include an organic explosive, an amorphous substance having a crystallinity of less than twenty five percent, a quasi-amorphous substance having a crystallinity at least equal to twenty-five percent and less than fifty percent, and a partially crystalline substance having a crystallinity at least equal to fifty percent and less than one-hundred percent. Examples of the amorphous, quasi-amorphous, and partially crystalline substances include a gel explosive, a slurry explosive, an explosive including ammonium nitrate, and a special nuclear material. Examples of the special nuclear material include plutonium and uranium. Examples of support 80 include a table and a conveyor belt. An example of scatter detector 18 includes a segmented detector fabricated from Germanium.

X-ray source 72 emits an x-ray beam 84 in an energy range, which is dependent on a voltage applied by a power source to x-ray source 72. Primary collimator 14 outputs a primary beam 86, such as a pencil beam, upon collimating x-ray beam 84 from x-ray source 72. Primary beam 86 is incident on a point 85 of substance 82 within container 79 arranged on support 80 to generate scattered radiation including a scattered beam 88. Scattered beam 88 forms a scatter angle value 89 with respect to primary beam 86. Secondary collimator 76 is located between support 80 and scatter detector 18.

Secondary collimator 76 includes a number of collimator elements, such as sheets, plates, or laminations. The collimator elements of scatter detector 18 are made of a secondary collimator material, which is a radiation-absorbing material, such as, steel, copper, silver, or tungsten. Secondary collimator 76 collimates a portion of the scattered radiation to output the remaining portion of the scattered radiation and the remaining portion includes scattered beam 88.

Above support 80, there is arranged transmission detector 17, which measures an intensity of primary beam 86. Moreover, above support 80, there is arranged scatter detector 18 that measures photon energies of the remaining portion of the scattered radiation received by scatter detector 18. Scatter detector 18 measures the x-ray photons within the remaining portion of the scattered radiation in an energy-sensitive manner by outputting a plurality of electrical output signals linearly dependent on a plurality of energies of the x-ray photons detected from within the remaining portion of the scattered radiation. Scatter detector 18 detects the remaining portion, including scattered beam 88, of the scattered radiation output from secondary collimator 76 to output a plurality of electrical signals.

In an alternative embodiment, gantry 12 includes a second scatter detector other than scatter detector 18. The second scatter detector is placed in the same yz plane as that of scatter detector 18. The second scatter detector is placed on a side, with respect to the y-axis, of transmission detector 17 that is the same as a side, with respect to the y-axis, of placement of scatter detector 18. Moreover, the second scatter detector is the same as scatter detector 18 and a distance of the second scatter detector from a center axis 101 is the same as a distance of scatter detector 18 from center axis 101. For example, the second scatter detector has the same number of detector elements as that of scatter detector 18. Additionally, the second scatter detector is placed on a side, with respect to center axis 101, opposite to a side, with respect to center axis 101, of placement of scatter detector 18. In an alternative embodiment, gantry 12 includes additional scatter detectors other than scatter detector 18 and other than the second scatter detector. The additional scatter detectors are located on a side, with respect to the y-axis and transmission detector 17, opposite to a side, with respect to the v-axis and transmission detector 17, of location of scatter detector 18 and the second scatter detector. The additional scatter detectors are placed in the same yz plane as that of scatter detector 18. Each of the additional scatter detectors have the same number of detector elements as that of scatter detector 18. In yet another alternative embodiment, gantry 12 includes any number of scatter detectors that are placed in the same yz plane as that of scatter detector 18.

Figure 2:
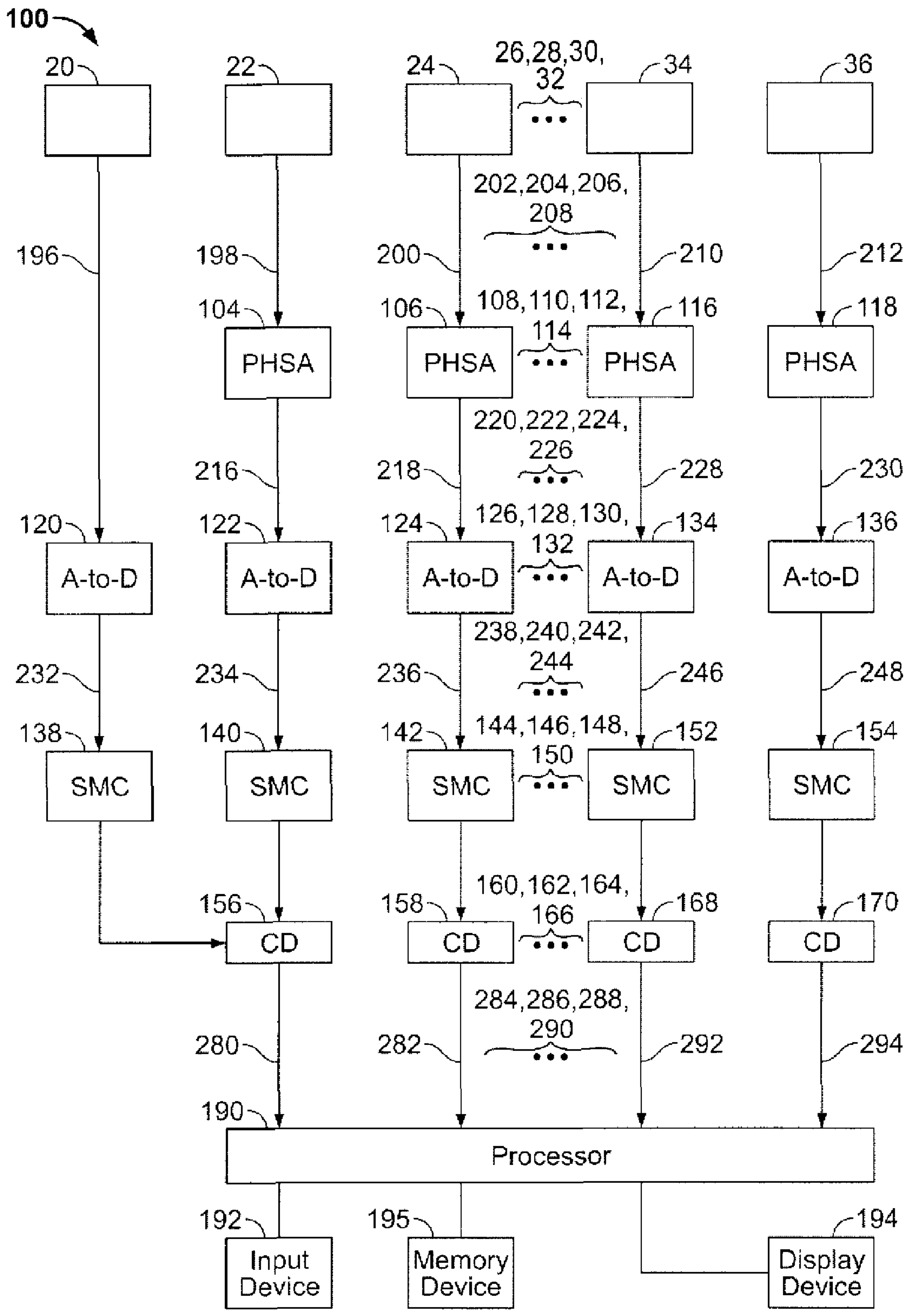
FIG. 2 is a block diagram of an embodiment of a system for generating a diffraction profile of a substance.

FIG. 2 is diagram of an embodiment of a system 100 for generating a diffraction profile of a substance. System 100 includes detector element 20 of transmission detector 17, detector elements 22, 24, 26, 28, 30, 32, 34, and 36 of scatter detector 18, a plurality of pulse-height shaper amplifiers (PHSA) 104, 106, 108, 110, 112, 114, 116, and 118, a plurality of analog-to-digital (A-to-D) converters 120, 122, 124, 126, 128, 130, 132, 134, and 136, a plurality of spectrum memory circuits (SMCs) 138, 140, 142, 144, 146, 148, 150, 152, and 154 allowing pulse height spectra to be acquired, a plurality of correction devices (CDs) 156, 158, 160, 162, 164, 166, 168, and 170, a processor 190, an input device 192, a display device 194, and a memory device 195. As used herein, the term processor is not limited to just those integrated circuits referred to in the art as a processor, but broadly refers to a computer, a microcontroller, a microcomputer, a programmable logic controller, an application specific integrated circuit, and any other programmable circuit. The computer may include a device, such as, a floppy disk drive or CD-ROM drive, for reading data including the methods for developing a secondary collimator from a computer-readable medium, such as a floppy disk, a compact disc-read only memory (CD-ROM), a magneto-optical disk (MOD), or a digital versatile disc (DVD). In another embodiment, processor 190 executes instructions stored in firmware. Examples of display device 194 include a liquid crystal display (LCD) and a cathode ray tube (CRT). Examples of input device 192 include a mouse and a keyboard. Examples of memory device 195 include a random access memory (RAM) and a read-only memory (ROM). An example of each of correction devices 156, 158, 160, 162, 164, 166, 168, and 170 include a divider circuit. Each of spectrum memory circuits 138, 140, 142, 144, 146, 148, 150, 152, and 154 include an adder and a memory device, such as a RAM or a ROM.

Detector element 20 is coupled to analog-to-digital converter 120, and detector elements 22, 24, 26, 28, 30, 32, 34, and 36 are coupled to pulse-height shaper amplifiers 104, 106, 108, 110, 112, 114, 116, and 118, respectively. Detector element 20 generates an electrical output signal 196 by detecting primary beam 86 and detector elements 22, 24, 26, 28, 30, 32, 34, and 36 generate a plurality of electrical output signals 198, 200, 202, 204, 206, 208, 210, and 212 by detecting scattered radiation within the remaining portion. For example, detector element 22 generates electrical output signal 198 for each scattered x-ray photon incident on detector element 22. Each pulse-height shaper amplifier amplifies an electrical output signal received from a detector element. For example, pulse-height shaper amplifier 104 amplifies electrical output signal 198 and pulse-height shaper amplifier 106 amplifies electrical output signal 200. Pulse-height shaper amplifiers 104, 106, 108, 110, 112, 114, 116, and 118 have a gain factor determined by processor 190.

An amplitude of an electrical output signal output from a detector element is proportional to an energy of an x-ray quantum that is detected by the detector element to generate the electrical output signal. For example, an amplitude of electrical output signal 196 is proportional to an energy of an x-ray quantum in primary beam 86 detected by detector element 20. As another example, an amplitude of electrical output signal 198 is proportional to an energy of an x-ray quantum within scattered radiation that is detected by detector element 22.

A pulse-height shaper amplifier generates an amplified output signal by amplifying an electrical output signal generated from a detector element. For example, pulse-height shaper amplifier 104 generates an amplified output signal 216 by amplifying electrical output signal 198 and pulse-height shaper amplifier 106 generates an amplified output signal 218 by amplifying electrical output signal 200. Similarly, a plurality of amplified output signals 220, 222, 224, 226, 228, and 230 are generated. An analog-to-digital converter converts an output signal from an analog form to a digital form to generate a digital output signal. For example, analog-to-digital converter 120 converts electrical output signal 196 from an analog form to a digital format to generate a digital output signal 232 and analog-to-digital converter 122 converts amplified output signal 216 from an analog form to a digital format to generate a digital output signal 234. Similarly, a plurality of digital output signals 236, 238, 240, 242, 244, 246, and 248 are generated by analog-to-digital converters 124, 126, 128, 130, 132, 134, and 136, respectively. A digital value of a digital output signal generated by an analog-to-digital converter represents an amplitude of energy of a pulse of an amplified output signal. For example, a digital value of digital output signal 234 output by analog-to-digital converter 122 is a value of an amplitude of a pulse of amplified output signal 216. Each pulse is generated by an x-ray quantum, such as an x-ray photon.

An adder of a spectrum memory circuit adds a number of pulses in a digital output signal. For example, when analog-to-digital converter 122 converts a pulse of amplified output signal 216 into digital output signal 234 to determine an amplitude of the pulse of amplified output signal 216, an adder within spectrum memory circuit 140 increments, by one, a value within a memory device of spectrum memory circuit 140. Accordingly, at an end of an x-ray examination of substance 82, a memory device within a spectrum memory circuit stores a number of x-ray quanta detected by a detector element. For example, a memory device within spectrum memory circuit 142 stores a number of x-ray photons detected by detector element 24 and each of the x-ray photons has an amplitude of energy or alternatively an amplitude of intensity that is determined by analog-to-digital converter 124.

A correction device receives a number of x-ray quanta that have a range of energies and are stored within a memory device of one of spectrum memory circuits 140, 142, 144, 146, 148, 150, 152, and 154, and divides the number by a number of x-ray quanta having the range of energies received from a memory device of spectrum memory circuit 138. For example, correction device 156 receives a number of x-ray photons having a range of energies from a memory device of spectrum memory circuit 140, and divides the number by a number of x-ray photons having the range received from a memory device of spectrum memory circuit 138. Each correction device outputs a correction output signal that represents a range of energies within x-ray quanta received by a detector element. For example, correction device 156 outputs a correction output signal 280 representing an energy spectrum or alternatively an intensity spectrum within x-ray quanta detected by detector element 22. As another example, correction device 158 outputs correction output signal 282 representing an energy spectrum within x-ray quanta detector element 24. Similarly, a plurality of correction output signals 284, 286, 288, 290, 292, and 294 are generated by correction devices 160, 162, 164, 166, 168, and 170, respectively.

It is noted that a number of pulse-height shaper amplifiers 104, 106, 108, 110, 112, 114, 116, and 118 changes with a number of detector elements 22, 24, 26, 28, 30, 32, 34, and 36 of scatter detector 18. For example, five pulse-height shaper amplifiers are used for amplifying signals received from five detector elements of scatter detector 18. As another example, four pulse-height shaper amplifiers are used for amplifying signals received from four detector elements of scatter detector 18. Similarly, a number of analog-to-digital converters 120, 122, 124, 126, 128, 130, 132, 134, and 136 changes with a number of detector elements 20, 22, 24, 26, 28, 30, 32, 34, and 36 and a number of spectrum memory circuits 138, 140, 142, 144, 146, 148, 150, 152, and 154 changes with the number of detector elements 20, 22, 24, 26, 28, 30, 32, 34, and 36.

Processor 190 receives a plurality of correction output signals, including correction output signals 280, 282, 284, 286, 288, 290, 292, and 294, to generate a momentum transfer x, measured in inverse nanometers ($nm^{-1}$), from an energy spectrum r(E) of energy E of x-ray quanta within the remaining portion, including scattered beam 88, detected by scatter detector 18 (FIG. 1). Processor 190 generates the momentum transfer x by applying $$x=(E/hc)\sin(\theta/2) \tag{1}$$

where c is a speed of light, h is Planck's constant, θ represents a scatter angle variable of x-ray quanta of the remaining portion detected by scatter detector 18 (FIG. 1). Scatter angle value 89 is an example of the scatter angle variable θ. Processor 190 relates the energy E to the momentum transfer x by equation (1). Processor 190 receives the scatter angle variable θ from a user, such as a human being, via input device 192. Processor 190 generates a diffraction profile of substance 82 (FIG. 1) by calculating a number of scatter x-ray photons that are detected by scatter detector 18 and by plotting the number versus the momentum transfer x.

Figure 3:
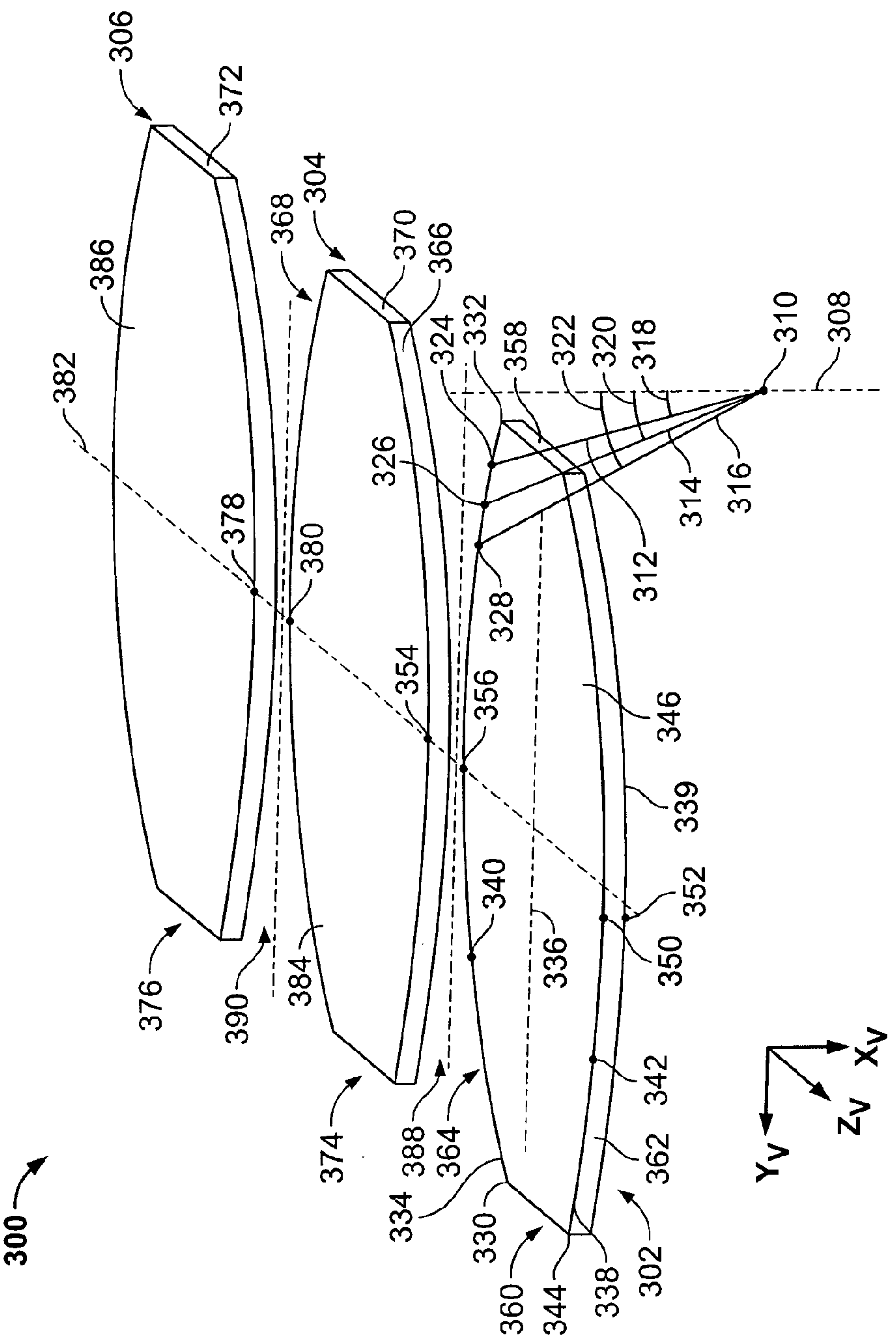
FIG. 3 is an isometric view of an embodiment of a virtual secondary collimator used to develop the secondary collimator of FIG. 1.

FIG. 3 is an isometric view of an embodiment of a virtual secondary collimator 300. Virtual secondary collimator 300 includes a plurality of virtual collimator elements 302, 304, and 306. Processor 190 generates a virtual primary beam 308, which is a virtual representation of primary beam 86. Processor 190 generates a point 310 which is a virtual representation of point 85. Processor 190 further generates a plurality of virtual scattered beams including virtual scattered beams 312, 314, and 316. In an alternative embodiment, processor 190 generates any number, such as 2, 4, 10, 20, or 30, of virtual scattered beams. Processor 190 generates a virtual scattered beam forming a virtual scatter angle value with respect to virtual primary beam 308. For example, processor generates virtual scattered beams 312 forming a virtual scatter angle value 318 with respect to virtual primary beam 308, generates virtual scattered beam 314 forming a virtual scatter angle value 320 with respect to virtual primary beam 308, and generates virtual scattered beam 316 forming a virtual scatter angle value 322 with respect to virtual primary beam 308.

Processor 190 generates a plurality of virtual scattered beams so that a modulus of a ratio of a first term including a difference between a first virtual scatter angle value formed by a first one of the virtual scattered beams with respect to virtual primary beam 308 and a second virtual scatter angle value formed by a second one of the virtual scattered beams with respect to virtual primary beam 308 and a second term including the first virtual scatter angle value is constant. For example, processor 190 generates virtual scattered beams 312, 314, and 316 so that a modulus of a ratio of a term including a difference between virtual scatter angle value 320 and virtual scatter angle value 318 and another term including virtual scatter angle value 318 is equal to a modulus of a ratio of a term including a difference between virtual scatter angle value 322 and virtual scatter angle value 320 and another term including virtual scatter angle value 320. The example is represented mathematically as $$\frac{\text{value320}-\text{value318}}{\text{value318}}=\frac{\text{value322}-\text{value320}}{\text{value320}} \tag{2}$$

Processor 190 determines a plurality of intersection points of intersection between virtual scattered beams 312, 314, and 316 and a $y_v z_v$ plane formed between a $y_v$ axis and a $z_v$ axis perpendicular to $y_v$ axis. For example, processor 190 determines that virtual scattered beam 312 intersects the $y_v z_v$ plane at an intersection point 324, virtual scattered beam 314 intersects the $y_v z_v$ plane at an intersection point 326, and virtual scattered beam 316 intersects the $y_v z_v$ plane at an intersection point 328. The $z_v$ axis is perpendicular to an $x_v$ axis that is perpendicular to the $y_v$ axis. The intersection points 324, 326, and 328 lie within the same $y_vz_v$ plane. For example, intersection point 324 lies in the same $y_vz_v$ plane as that of location of intersection point 326.

Processor 190 generates a number of the intersection points between a first edge intersection point 330 and a second edge intersection point 332 and a shortest distance between first edge intersection point 330 and second edge intersection point 332 is proportional, by a first factor, such as one-half or one-third, to a distance between side walls 19 and 23. The shortest distance between first edge intersection point 330 and second edge intersection point 332 is a distance that is the shortest among a plurality of distances between first edge intersection point 330 and second edge intersection point 332. The user provides the number of intersection points to be generated to processor 190 via input device 192. The user also inputs, via input device 192, the distance between side walls 19 and 23 to processor 190.

Processor 190 generates a curve 334 connecting the intersection points and curve 334 extends from first edge intersection point 330 to second edge intersection point 332. Processor 190 generates a collimator element axis 336, generates a curve 338 that is a mirror image of curve 334 and that lies in the same $y_vz_v$ plane as curve 334, and curves 334 and 338 are symmetrical with respect to collimator element axis 336. For example, processor 190 generates curve 338 and a distance from a point 340 on curve 334 to collimator element axis 336 is equal to a distance from a point 342 on curve 338 to collimator element axis 336. Processor 190 generates curve 338 so that a distance, along or parallel to the $z_v$ axis, between an edge 344 of curve 338 and first edge intersection point 330 is equal to a distance provided to processor 190 by the user via input device 192. The distance, along the $z_v$ axis, between edge 344 of curve 338 and first edge intersection point 330 is shortest among a plurality of distances, along the $z_v$ axis, between curves 334 and 338.

Processor 190 generates a surface 346, in the yvzv plane of curves 334 and 338, between curves 334 and 338. Processor 190 generates surface 346 to be symmetrical with respect to collimator element axis 336. Processor 190 generates virtual collimator element 302 having a thickness, along or parallel to the xv axis, and virtual collimator element 302 is symmetrical with respect to a centroid of virtual collimator element 302. For example, processor 190 generates virtual collimator element 302 and a distance between the centroid of virtual collimator element 302 and a point 350 is equal to a distance between the centroid and a point 352, and points 350 and 352 are located on the same xv axis. Moreover, point 350 is located on curve 338 and point 352 is located on a curve 339. Curves 338 and 339 are edges of virtual collimator element 302. The thickness of virtual collimator element 302 is provided by the user to processor 190 via input device 192. Processor 190 generates virtual collimator element 302 to have an end 358 located parallel to the zv axis and another end 360 located parallel to the zv axis. Virtual collimator element 302 also has a curved end 362 having a thickness along the xv axis and another curved end 364 having the thickness along the xv axis. Curves 338 and 339 are edges of curved end 362. Curved end 364 is a mirror image of curved end 362.

Processor 190 generates any number, such as 2, 4, 5, 6, 10, 20, or 30, of virtual collimator elements that lie in the same $y_vz_v$ plane as that of virtual collimator element 302 and each of the virtual collimator elements has the same dimensions as that of virtual collimator element 302. For example, processor 190 generates virtual collimator element 304 that lies in the same $y_vz_v$ plane as that of virtual collimator element 302 and generates virtual collimator element 306 that lies in the same $y_vz_v$ plane as that of virtual collimator element 302, and each virtual collimator element 304 and 306 is of the same size as virtual collimator element 302. Processor 190 generates virtual collimator element 304 having a curved end 366 having a thickness along the $x_v$ axis and another curved end 368 having the thickness along the $x_v$ axis. Each virtual collimator element 302, 304, and 306 has the same uniform thickness, along the $x_v$ axis, and the thickness is input to processor 190 by the user via input device 194.

Processor 190 generates a virtual collimator element having an end that lies in the same $x_vz_v$ plane, formed between the $x_v$ axis and the $z_v$ axis, as that of end 358 of virtual collimator element 302. For example, processor 190 generates virtual collimator element 304 having an end 370 lying in the same $x_vz_v$ plane as that of end 358 and generates virtual collimator element 306 having an end 372 lying in the same $x_vz_v$ plane as that of end 358. Moreover, processor 190 generates a virtual collimator element having an end that lies in the same $x_vz_v$ plane as that of end 360 of virtual collimator element 302. For example, processor 190 generates virtual collimator element 304 having an end 374 lying in the same $x_vz_v$ plane as that of end 360 and generates virtual collimator element 306 having an end 376 lying in the same $x_vz_v$ plane as that of end 360. End 358 does not face end 360, end 370 does not face end 374, and end 372 does not face end 376.

Processor 190 generates virtual collimator element 304 including a point 354, which is at a shortest distance, along the $z_v$ axis, from a point 356 of virtual collimator element 302 and generates virtual collimator element 306 including a point 378 at the shortest distance, along the $z_v$ axis, from a point 380 of virtual collimator element 304. The shortest distance, along the $z_v$ axis, between points of any two adjacent virtual collimator elements is provided by the user to processor 190 via input device 192. For example, the user operates a keyboard to provide the shortest distance, along the $z_v$ axis, between points 354 and 356 of virtual collimator elements 302 and 304. The shortest distance, along the $z_v$ axis, between points of two adjacent virtual collimator elements is a distance that is shortest among all distances, along the $z_v$ axis, between the adjacent virtual collimator elements. For example, the shortest distance, along the $z_v$ axis, between virtual collimator elements 302 and 304 is a distance, along the $z_v$ axis, between point 354 of virtual collimator element 304 and point 356 of virtual collimator element 302. Points 354, 356, 378, and 380 are located on an axis 382 that passes through a plurality of centers of a plurality of surfaces 346, 384, and 386 of virtual collimator elements 302, 304, and 306. Points 356 is located on curve 334, point 354 is located on an edge of surface 384 and the edge of surface 384 faces an edge of location of point 356 on surface 346, and point 378 is located on an edge of surface 386 and the edge of surface 386 faces an edge of location of point 380 on surface 384. Surfaces 346, 384, and 386 are located in the same $y_vz_v$ plane. For example, surface 346 is located in the same $y_vz_v$ plane as that of surface 384.

Processor 190 generates a first virtual collimator element separated by a first virtual opening or spacing or slit from a second virtual collimator element and a size of the first virtual opening is the same as a size of a second virtual opening formed between the second virtual collimator element and a third virtual collimator element. For example, a virtual opening 388 formed between virtual collimator elements 302 and 304 has the same size as that of a virtual opening 390 between virtual collimator elements 304 and 306. As another example, a distance, along the zv axis, between ends 358 and 370 is equal to a distance, along the zv axis, between ends 370 and 372. Each virtual opening 388 and 390 does not have a constant width as viewed along or parallel to each of the yv and zv axes. A width of each virtual opening 388 and 390 is measured along the zv axis.

Figure 4:
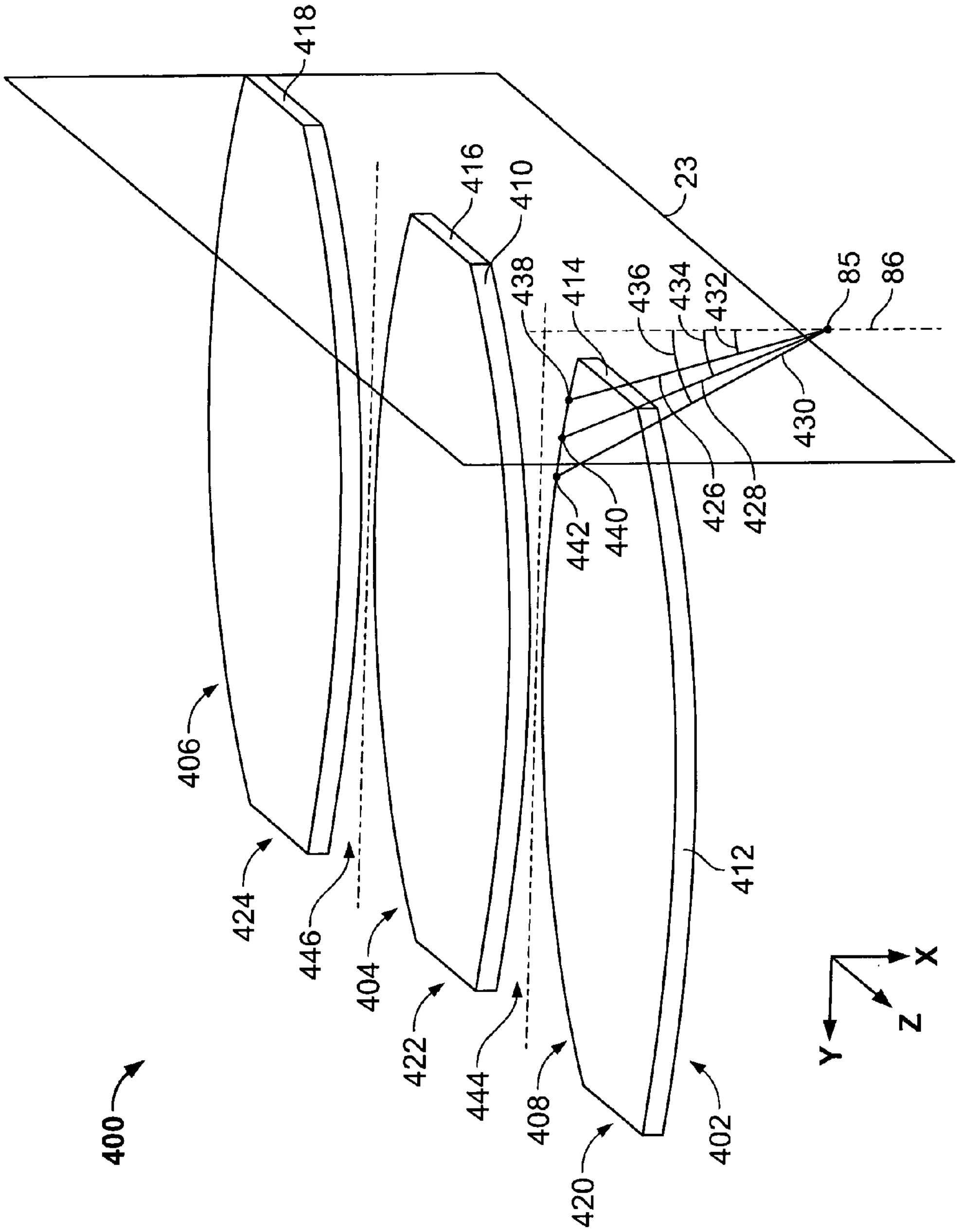
FIG. 4 is an isometric view of an embodiment of the secondary collimator of FIG. 1.

FIG. 4 is an isometric view of an embodiment of a secondary collimator 400. Secondary collimator 400 includes a plurality of collimator elements 402, 404, and 406 that are located in the same yz plane. Secondary collimator 400 is an example of secondary collimator 76. Virtual secondary collimator 300 is a virtual representation of secondary collimator 400. Moreover, virtual collimator element 302 is a ritual representation of collimator 402, virtual collimator 304 is a virtual representation of collimator element 404, and virtual collimator element 306 is a ritual representation of collimator element 406. In an alternative embodiment, secondary collimator 400 includes any number, such as, 2, 4, 5, 6, or 10, of collimator elements lying in the same yz plane.

The user fabricates secondary collimator 400 to be proportional, by a second factor, such as 2 or 3, to virtual secondary collimator 300. For example, the user fabricates collimator 402 to have a size that is twice a size of virtual collimator element 302. As another example, the user fabricates collimator element 404 to have a size that is twice a size of virtual collimator element 304. As yet another example, the user fabricates collimator element 406 to have a size that is twice a size of virtual collimator element 306. As still another example, the user fabricates collimator element 402 having a curved end 408 and collimator element 404 having a curved end 410 and a shortest distance between curved ends 408 and 410 is proportional, by the second factor, to a shortest distance between curved ends 364 and 366 of virtual collimator elements 302 and 304. The shortest distance between curved ends 408 and 410 is a distance that is the shortest among a plurality of distances between curved ends 408 and 410. Similarly, the shortest distance between curved ends 364 and 366 is a distance that is the shortest among a plurality of distances between curved ends 364 and 366. Curved end 364 is a virtual representation of curved end 408 and curved end 366 is a virtual representation of curved end 410. Moreover, collimator element 402 includes another curved end 412 that is a mirror image of curved end 408. Curved end 362 is a virtual representation of curved end 412.

The user fabricates each collimator element of secondary collimator 400 from the secondary collimator material. The user fabricates a collimator element of secondary collimator 400 by using a machining device, such as, a molding machine or a circular rotating diamond saw. For example, the user obtains a block of the secondary collimator material, and cuts, by using the circular rotating diamond saw, each of collimator elements 402, 404, and 406 of a size proportional, by the second factor, to a size of respective virtual collimator elements 302, 304, and 306. For example, the user obtains a block of the secondary collimator material, and cuts, by using the circular rotating diamond saw, collimator element 402 of a size proportional, by the second factor, to a size of virtual collimator element 302. As another example, the user pours a liquid form of the secondary collimator material in the molding machine having a size proportional, by the second factor, to a size of virtual collimator element 304, and cools the secondary collimator material to fabricate collimator element 404. As yet another example, the user uses the circular rotating diamond saw to fabricate collimator element 406 having a size proportional, by the second factor, to a size of virtual collimator element 306. The user can measure dimensions of a collimator element by using a measuring tape and determine whether the dimensions are proportional, by the second factor, to the dimensions of a virtual collimator element. Each collimator element, lying in the same yz plane, has the same dimensions. For example, collimator element 402 lies in the yz plane of location of collimator elements 404 and 406 and is of the same size as that of collimator elements 404 and 406.

The user attaches, such as glues, welds, or bolts, an end of collimator element to side wall 23. For example, the user glues an end 414 of collimator element 402 to side wall 23. As another example, the user welds an end 416 of collimator element 404 to side wall 23 and the user bolts an end 418 of collimator element 406 to side wall 23. In an alternative embodiment, the user attaches an end of a collimator element to side wall 19 instead of side wall 23. For example, the user welds an end 420 of collimator element 402 to side wall 19. As another example, the user glues an end 422 of collimator element 404 to side wall 19 and bolts and end 424 of collimator element 406 to side wall 19. In yet another alternative embodiment, the user attaches a collimator element to side walls 19 and 23. For example, the user welds collimator element 402 to side walls 19 and 23. End 358 is a virtual representation of end 414, end 370 is a virtual representation of end 416, and end 372 is a virtual representation of end 418. Moreover, end 360 is a virtual representation of end 420, end 374 is a virtual representation of end 422, and end 376 is a virtual representation of end 424. Collimator elements 402, 404, and 406 are located in the same yz plane.

When primary beam 86 is incident on point 85, a plurality of scattered beams 426, 428, and 430 are output. Scattered beam 426 forms a scatter angle value 432 with respect to primary beam 86, scattered beam 428 forms a scatter angle value 434 with respect to primary beam 86, and scattered 430 beam forms a scatter angle value 436 with respect to primary beam 86. Each of scatter angle values 432, 434, and 436 are values of the scatter angle variable θ. Scattered beam 426 is incident on a point 438 located on collimator element 402, scattered 428 beam is incident on a point 440 located on collimator element 402, and scattered 430 beam is incident on a point 442 located on collimator element 402. Intersection point 324 is a virtual representation of point 438, intersection point 326 is a virtual representation of point 440, and intersection point 328 is a virtual representation of point 442.

Collimator element 402 is fabricated so that a modulus of a ratio of a third term including a difference between a first scatter angle value formed by a first scattered beam, incident on a curved end of collimator element 402, with respect to primary beam 86 and a second scatter angle value formed by a second scattered beam, incident on the curved end, with respect to primary beam 86 and a fourth term including the first scatter angle value is constant. For example, collimator element 402 is fabricated so that a modulus of a ratio of a difference between a term including scatter angle value 434 and scatter angle value 432 and another term including scatter angle value 432 is equal to a modulus of a ratio of a difference between a term including scatter angle value 436 and scatter angle value 434 and another term including scatter angle value 434. The example is represented mathematically as $$\frac{\text{value434} - \text{value432}}{\text{value432}} = \frac{\text{value436} - \text{value434}}{\text{value434}}. \tag{3}$$

Virtual scatter angle value 318 is a virtual representation of scatter angle value 432, virtual scatter angle value 320 is a virtual representation of scatter angle value 434, and virtual scatter angle value 322 is a virtual representation of scatter angle value 436. Ends 414, 416, and 418 of collimator elements 402, 404, and 406 lie in the same xz plane formed by the x and z axes. For example, end 414 lies in the same xz plane as that of end 416. Moreover, ends 420, 422, and 424 of collimator elements 402, 404, and 406 lie in the same xz plane formed by the x and y axes. For example, end 420 lies in the same xz plane as that of end 422.

A first collimator element, adjacent to a second collimator element, is spaced apart from the second collimator element via a first opening or spacing or slit that has the same dimensions as that of a second opening between the second collimator element and a third collimator element adjacent to the second collimator element. For example, an opening 444 between collimator elements 402 and 404 has the same size as that of an opening 446 between collimator elements 404 and 406. As another example, a distance, along or parallel to the z-axis, between ends 414 and 416 is equal to a distance, along the z-axis between ends 416 and 418. As another example, a distance, along the z-axis, between ends 420 and 422 is equal to a distance, along the z-axis between ends 422 and 424. Each of openings 444 and 446 does not have a constant width as viewed along or parallel to the y-axis. For example, a width, measured along the z-axis and between centroids of collimator elements 402 and 404, of opening 444 is different than a width, measured along the z-axis, between ends 414 and 416. A width of each opening 444 and 446 is measured along the z-axis. Virtual opening 388 is a virtual representation of opening 444 and a size of opening 444 is proportional, by the second factor, to a size of virtual opening 388. For example, a distance between ends 414 and 416 is proportional, by the second factor, to a distance between ends 358 and 370. As another example, a distance between ends 420 and 422 is proportional, by the second factor, to a distance between ends 360 and 374. Moreover, virtual opening 390 is a virtual representation of opening 446 and a size of opening 446 is proportional, by the second factor, to a size of virtual opening 390. For example, a distance between ends 416 and 418 is proportional, by the second factor, to a distance between ends 370 and 372. As another example, a distance between ends 422 and 424 is proportional, by the second factor, to a distance between ends 374 and 376. Each collimator element 402, 404, and 406 has the same uniform thickness, that is proportional by the second factor, to a thickness of any of virtual collimator elements 302, 304, and 306.

Figure 5:
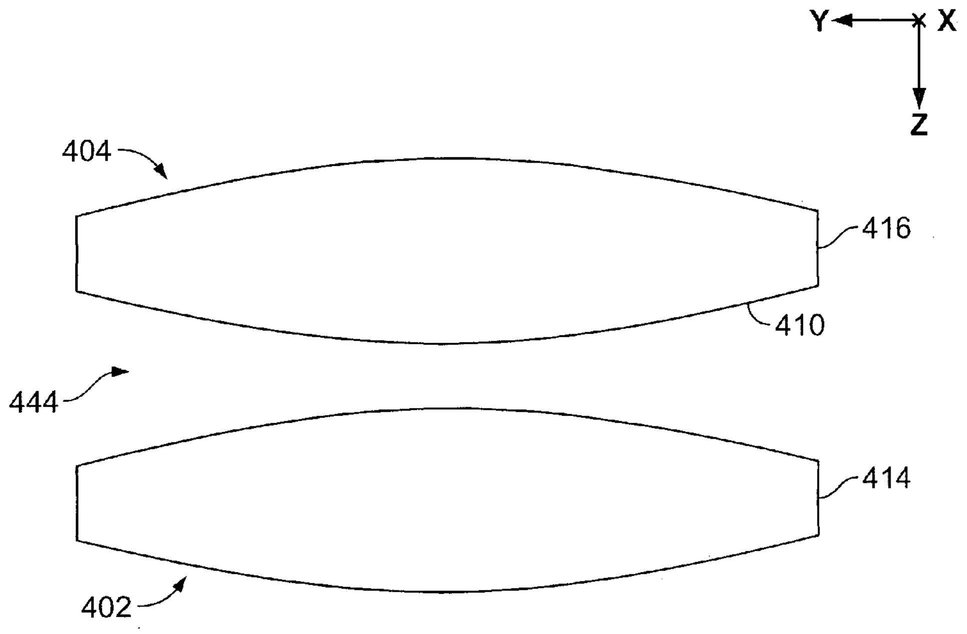
FIG. 5 is a top view of an embodiment of the secondary collimator of FIG. 4.

FIG. 5 is a top view of an embodiment of secondary collimator 400 including collimator elements 402 and 404. As an example, a length, along the y-axis, of each collimator element 402, 404, and 406 ranges from and including 90 millimeters (mm) to 110 mm, a longest width, along the z-axis, of each collimator element 402, 404, and 406 ranges from and including 6 mm to 8 mm, and a thickness, along or parallel to the x-axis, of each collimator element 402, 404, and 406 ranges from and including 0.5 mm to 3 mm. The longest width, along the z-axis, of a collimator element is a width, along the z-axis, that is longest among a plurality of widths, along the z-axis, of the collimator element. Opening 444 lies between collimator elements 402 and 404. An example of a length of opening 444, along the y-axis, is a length that is the same as a length of each collimator element 402 and 404. An example of a shortest width, along the z-axis, of opening 444 ranges from and including 0.5 mm to 1 mm, a thickness, along the x-axis, of opening 444 is the same as a thickness of each collimator element 402 and 404. The shortest width, along the z-axis, of opening 444 is a width that is the shortest among a plurality of widths of opening 444.

Figure 6:
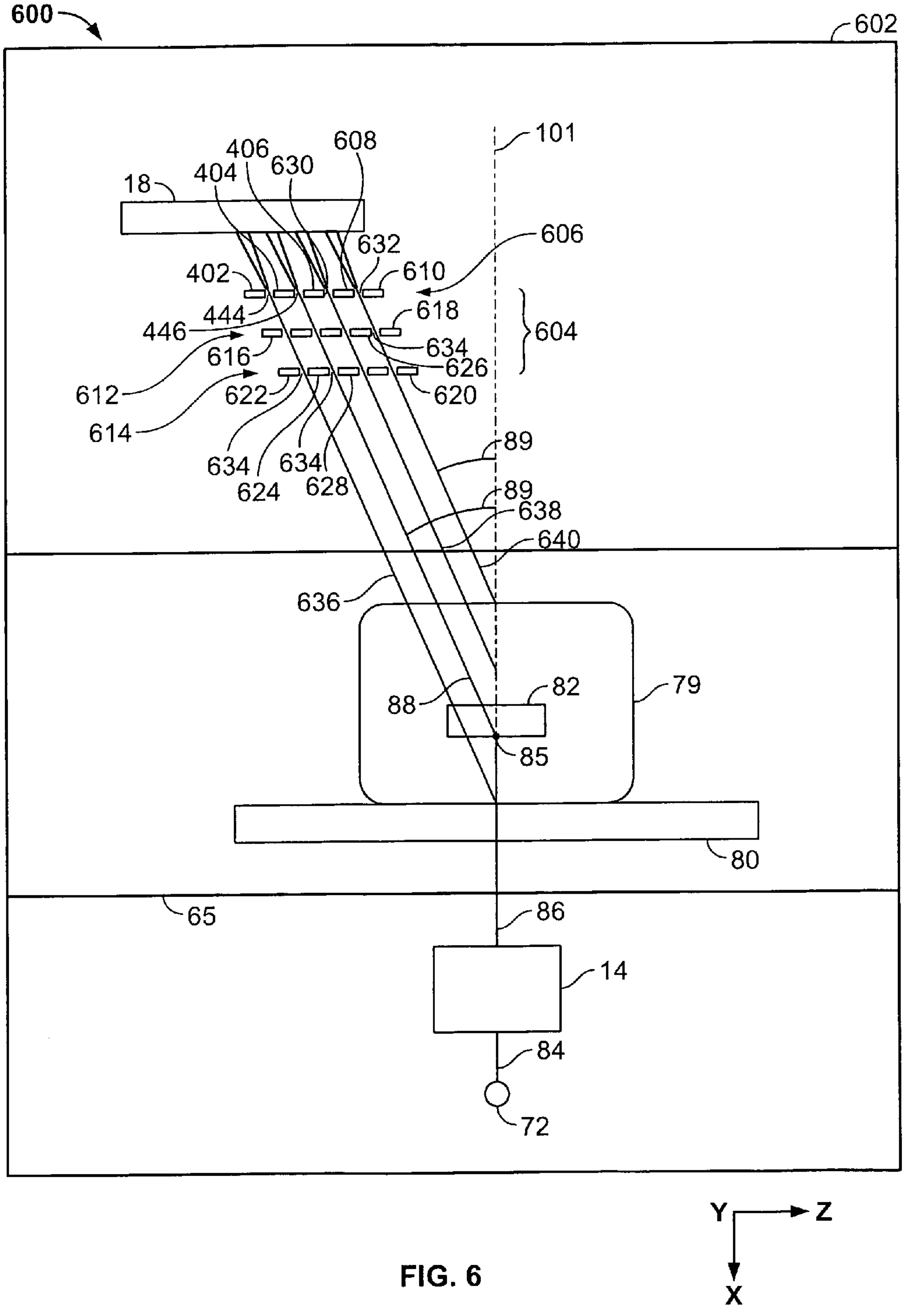
FIG. 6 is a side view of an embodiment of a system for implementing the secondary collimator of FIG. 4.

FIG. 6 is a side view of an embodiment of system 600 for implementing a secondary collimator. System 600 includes including a gantry 602, which is an example of gantry 12. Gantry 602 includes a secondary collimator 604, which is an example of secondary collimator 76. Secondary collimator 604 includes a collimator layer 606 of collimator elements 402, 404, and 406, a collimator element 608, and a collimator element 610. Secondary collimator 604 further includes a plurality of collimator layers 612 and 614 of collimator elements including collimator elements 616, 618, 620, 622, 624, 626, and 628. In an alternative embodiment, secondary collimator 604 includes any number, such as 1, 2, 4, 5, or 10, of collimator layers. Collimator elements within each collimator layer lie within the same yz plane. For example, collimator elements 616, 618, and 626 within collimator layer 612 lies within a first yz plane. As another example, collimator elements 620, 622, 624, and 628 within collimator layer 614 lies within a second yz plane parallel to the first yz plane. Collimator elements within a collimator layer have the same size. For example, each of collimator elements 608 and 610 have the same size as any of collimator elements 402, 404, and 406 within collimator layer 606. Moreover, collimator elements of collimator layers other than collimator layer 606 closest to scatter detector 18 have the same size. For example, each of collimator elements 616, 618, and 626 of collimator layer 612 has the same size as any of collimator elements 620, 622, 624, and 628 of collimator layer 614. Collimator layer 606 is closest, along the x-axis, to scatter detector 18 than collimator layers 612 and 614. A distance between collimator layer 606 and scatter detector 18 is shortest among any other distances from scatter detector 18 to any other collimator layer of secondary collimator 604. For example, a distance measured, parallel to an xz plane, between scatter detector 18 and collimator layer 606 is shorter than a distance, measured parallel to the xz plane, between scatter detector 18 and collimator layer 612.

Collimator layers 606, 612, and 614 are parallel to each other. For example, collimator layer 606 is parallel to collimator layer 612. The user places collimator layers 606, 608, and 610 parallel to each other by using a laser pointer. In an alternative embodiment, secondary collimator 604 does not include collimator layers other than collimator layer 606. For example, secondary collimator 604 does not include collimator layers 612 and 614. Each collimator element of collimator layers 606, 612, and 614 of secondary collimator 604 is attached to side wall 19 and/or side wall 23. For example, collimator elements 402, 404, 406, 608, 610, 616, 618, 620, 622, 624, 626, and 628 are welded to side wall 19. As another example, collimator elements 402, 404, 406, 608, 610, 616, 618, 620, 622, 624, 626, and 628 are welded to side wall 23. As yet another example, collimator elements 402, 404, 406, 608, 610, 616, 618, 620, 622, 624, 626, and 628 are glued to side walls 19 and 23. Collimator layer 612 is displaced, along the z-axis, by a distance, such as ranging from and including 3 mm to 4 mm, relative to collimator layer 606, and collimator layer 614 is displaced, along the z-axis, by a distance, such as ranging from and including 3 mm to 4 mm, relative to collimator layer 612. For example, collimator element 616 is displaced, along the z-axis, by 3.5 mm relative to collimator element 402. As another example, collimator element 622 is displaced, along the z-axis, by 3.7 mm relative to collimator element 616.

A distance, along the x-axis, between a first set of two adjacent collimator layers is the same as a distance, along the x-axis, between a second set of two adjacent collimator layers. For example, a distance, along the x-axis, between collimator layers 606 and 612 is equal to a distance, along the x-axis, between collimator layers 612 and 614. As another example, a distance, along the x-axis, between collimator layers 606 and 612 ranges from and including 10 mm to 15 mm, and the distance is the same as a distance, along the x-axis, between collimator layers 612 and 614. In an alternative embodiment, a distance, along the x-axis, between the first set of two adjacent collimator layers is not the same as a distance, along the x-axis, between the second set of two adjacent collimator layers.

Each collimator layer 606, 612, and 614 includes any number, such as 3, 4, 6, or 10, greater than two collimator elements lying in the same yz plane. For example, collimator layer 606 includes five collimator elements lying in the same yz plane. An opening is formed between any two adjacent collimator elements of a collimator layer. For example, an opening 630 is formed between collimator elements 406 and 608, which are adjacent to each other and an opening 632 is formed between collimator elements 608 and 610, which are adjacent to each other. Each of openings 630 and 632 has the same size as that of any of openings 444 and 446. Moreover, an opening is formed between any two adjacent collimator elements of any of collimator layers 612 and 614. For example, an opening 634 is formed between collimator elements 622 and 624, adjacent to each other and opening 634 is formed between collimator elements 618 and 626 adjacent to each other. Openings formed between adjacent collimator elements of a collimator layer have the same size. For example, opening 634 between collimator elements 622 and 624 have the same size as opening 634 between collimator elements 624 and 628. Moreover, openings formed between adjacent collimator elements of collimator layer 606 have the same size. For example, opening 632 between collimator elements 608 and 610 have the same size as opening 446 between collimator elements 404 and 406.

When primary beam 86 intersects container 79, scattered beam 88, a scattered beam 636, and a scattered beam 638, and a scattered beam 640 are output from container 79. A portion, extending between collimator layers 606 and 614, of each of scattered beams 88, 636, 638, and 640 form the same scatter angle value 89 with respect to primary beam 86. For example, portions, extending between collimator layers 606 and 614, of scattered beams 88, 636, 638, and 640 are parallel to each other. A remaining portion, shown as a dark portion, between collimator layer 606 and scatter detector 18 does not form a constant scatter angle with respect to primary beam 86. Each scattered beam 88, 636, 638, and 640 passes through at least one opening of secondary collimator 604. For example, scattered beam 88 passes through openings 634 of collimator layers 612 and 614, and through opening 446 of collimator layer 606.

Figure 7:
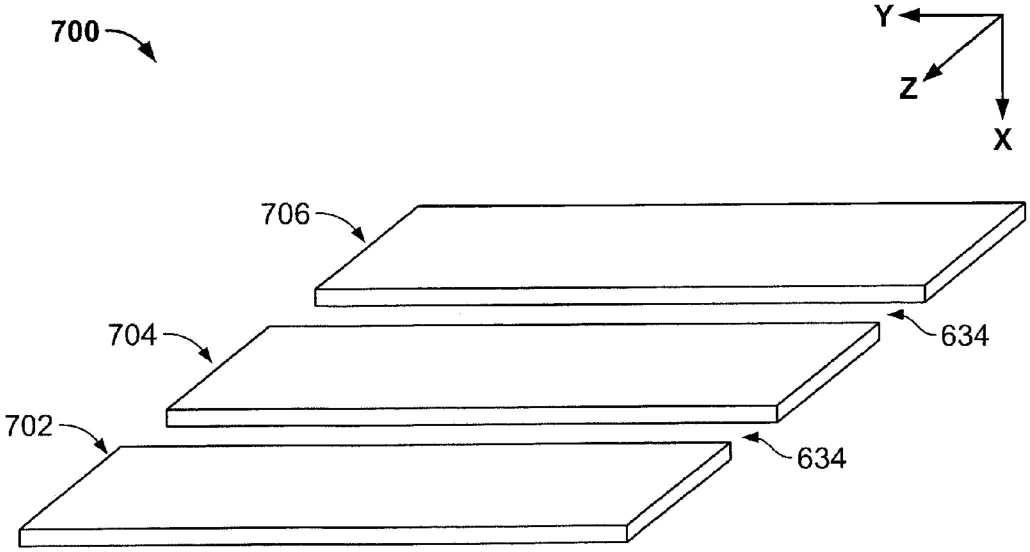
FIG. 7 is an isometric view of an embodiment of a system including a plurality of collimator elements that can be implemented within the system of FIG. 6.

FIG. 7 is an isometric view of an embodiment of a system 700 including a plurality of collimator elements 702, 704, and 706. Collimator elements 702, 704, and 706 are collimator elements of any of collimator layers 612 and 614. For example, collimator element 702 is an example of collimator element 622 of collimator layer 614, collimator element 704 is an example of collimator element 624, and collimator element 706 is an example of collimator element 628. As another example, collimator element 702 is an example of collimator element 616 of collimator layer 612. Collimator elements 702, 704, and 706 lie in the same yz plane. Collimator elements 702, 704, and 706 are fabricated from the secondary collimator material and are fabricated by the user by using any of the machining devices. Each collimator element 702, 704, and 706 has the same size. For example, collimator element 702 has a length, along the y-axis, ranging from and including 0.7 meters (m) to 1.3 m, has a width, along the z-axis, ranging from and including 20 mm to 30 mm, and has a thickness, along the x-axis, ranging from and including 3 mm to 5 mm, which is the same as the size of collimator element 704. Each collimator element 702, 704, and 706 has a uniform width, along the z-axis and does not include a curved end. Moreover, each collimator 702, 704, and 706 has a uniform thickness, along the x-axis.

Opening 634 is formed between two adjacent collimator elements of system. For example, opening 634 is formed between collimator elements 702 and 704. As another example, opening 634 is formed between collimator elements 704 and 706. As an example, each of openings 634 have a length, along the y-axis, that is the same as a length of any of collimator elements 702 and 704. As yet another example, each of openings 634 have a width, along the z-axis, ranging from and including 0.2 mm to 0.6 mm. As yet another example, each of openings have a thickness, along the x-axis, that is the same as that of a thickness of any of collimator elements 702, 704, and 706. In an alternative embodiment, system includes any number, such as 2, 4, 6, or 7, of collimator elements lying in the same yz plane.

Technical effects of the herein described systems and methods for developing a secondary collimator include developing secondary collimator 400 that outputs scattered radiation having a plurality of scatter angles with respect to primary beam 86. Other technical effects include generating and maintaining separate peaks of the diffraction profile regardless of a value of the scatter angle variable θ by keeping the modulus of the ratio of the first and second terms constant and by keeping the modulus of the ratio of the third and fourth terms constant. The scatter angle variable θ represents a scaling factor between the momentum transfer x and the energy E. Secondary collimator 400 permits a variation, up to a factor of three, in the scatter angle variable θ in a single scan of container 79. Yet other technical effects include a lower value of the scatter angle variable θ is used for analyzing a dense container and a higher value of the scatter angle variable θ is advantageous for analyzing a light bag because a useful range of the momentum transfer x is increased with an increase in a range of the scatter angle variable θ. Still other technical effects include an increase in passage of scattered radiation through opening 444 compared to an opening of constant width. As a result of the increase in passage, a signal-to-noise ratio is improved and an optimum detection of substance 82 is provided while minimizing a probability of a false alarm.

While the invention has been described in terms of various specific embodiments, those skilled in the art will recognize that the invention can be practiced with modification within the spirit and scope of the claims.

What is claimed is:

1. A method for developing a secondary collimator, said method comprising:

orienting a plurality of collimator elements in a plane such that a gap is defined between a first collimator element and a second collimator element of the plurality of collimator elements; and curving a first end of the first collimator element, the first end facing the second collimator element across the gap, such that a width of the gap varies.

2. A method in accordance with claim 1, said curving a first end further comprising:

generating a plurality of scattered beams;

fitting a curve to a plurality of intersection points formed by intersection of the plurality of scattered beams with the plane; and shaping the first end to match the curve.

3. A method in accordance with claim 2, said generating a plurality of scattered beams further comprising:

generating a primary beam; and generating the plurality of scattered beams from a point on the primary beam, wherein a first one of the plurality of scattered beams forms a first angle with the primary beam, a second one of the plurality of scattered beams forms a second angle with the primary beam, and a third one of the plurality of scattered beams forms a third angle with the primary beam, wherein a ratio of a difference between the second angle and the first angle divided by the first angle is equal to a ratio of a difference between the third angle and the second angle divided by the second angle.

4. A method in accordance with claim 1, further comprising attaching at least one of the plurality of collimator elements to a side wall of a gantry.

5. A method in accordance with claim 1, further comprising curving a second end of the second collimator element, the second end facing the first end of the first collimator element across the gap.

6. A method in accordance with claim 1, wherein a said curving a first end further comprises curving the first end such that a scatter angle of scattered radiation passing through the gap varies along the gap.

7. A method in accordance with claim 1 further comprising curving an opposite end of the first collimator element such that the opposite end is a mirror image of the first end.

8. A computer program embodied on a computer-readable medium, said computer program comprising at least one code segment that configures a processor to:

orient a plurality of virtual collimator elements in a virtual plane such that a virtual gap is defined between a first virtual collimator element and a second virtual collimator element of the plurality of virtual collimator elements; and curve a first end of the first virtual collimator element, the first end facing the second virtual collimator element across the virtual gap, such that a width of the virtual gap varies.

9. A computer program in accordance with claim 8, wherein the at least one code segment further configures the processor to:

generate a plurality of virtual scattered beams;

fit a curve to a plurality of intersection points formed by intersection of the plurality of virtual scattered beams with the virtual plane; and shape the first end to match the curve.

10. A computer program in accordance with claim 9, wherein the at least one code segment further configures the processor to:

generate a virtual primary beam; and generate the plurality of virtual scattered beams from a point on the virtual primary beam, wherein a first one of the plurality of virtual scattered beams forms a first angle with the virtual primary beam, a second one of the plurality of virtual scattered beams forms a second angle with the virtual primary beam, and a third one of the plurality of virtual scattered beams forms a third angle with the virtual primary beam, wherein a ratio of a difference between the second angle and the first angle divided by the first angle is equal to a ratio of a difference between the third angle and the second angle divided by the second angle.

11. An imaging system comprising:

a source configured to generate energy;

a detector configured to detect the energy; and a collimator placed between an object and said detector, said collimator comprising a plurality of collimator elements oriented in a plane such that a gap is defined between a first collimator element and a second collimator element of said plurality of collimator elements, said first collimator element comprising a first curved end, said first curved end facing said second collimator element across the gap, said first curved end at least partially defines a width of the gap such that the width varies.

12. An imaging system in accordance with claim 11, wherein said source is configured to generate a primary beam to interact with the object such that a plurality of scattered beams originates from a point on the primary beam, said first curved end intersects a first one, a second one, and a third one of the plurality of scattered beams, wherein the first one of the plurality of scattered beams forms a first angle with the primary beam, the second one of the plurality of scattered beams forms a second angle with the primary beam, and the third one of the plurality of scattered beams forms a third angle with the primary beam, a ratio of a difference between the second angle and the first angle divided by the first angle is equal to a ratio of a difference between the third angle and the second angle divided by the second angle.

13. An imaging system in accordance with claim 11, wherein at least one of said plurality of collimator elements is attached to a side wall of a gantry.

14. A computer program in accordance with claim 8, wherein the at least one code segment further configures the processor to curve an opposite end of the first virtual collimator element such that the opposite end is a mirror image of the first end.

15. A computer program in accordance with claim 8, wherein the at least one code segment further configures the processor to set a shortest distance between the first virtual collimator element and the second virtual collimator element equal to a selected value.

16. A computer program in accordance with claim 8, wherein the at least one code segment further configures the processor to size the first virtual collimator element such that the first end extends between a first virtual side wall and a second virtual side wall.

17. An imaging system in accordance with claim 11, wherein said curved first end at least partially defines the width of the gap such that a scatter angle of scattered radiation passing through the gap varies along the gap.

18. An imaging system in accordance with claim 11, wherein said second collimator element comprises a second curved end, said second curved end facing said first curved end of said first collimator element across the gap.

* * * * *